Dec. 16, 1952 M. E. DOW ET AL 2,621,935
FERTILIZER AND SEED DISTRIBUTOR
Filed Nov. 28, 1947 3 Sheets-Sheet 1

Marion E. Dow,
Raymond E. Dow, INVENTORS
Wainrite Dow.

BY Victor J. Evans & Co.

ATTORNEYS

Dec. 16, 1952   M. E. DOW ET AL   2,621,935
FERTILIZER AND SEED DISTRIBUTOR
Filed Nov. 28, 1947   3 Sheets-Sheet 2

Marion E. Dow,
Raymond E. Dow, INVENTORS
Wainrite Dow.
BY Victor J. Evans & Co.

ATTORNEYS

Dec. 16, 1952   M. E. DOW ET AL   2,621,935
FERTILIZER AND SEED DISTRIBUTOR
Filed Nov. 28, 1947   3 Sheets-Sheet 3
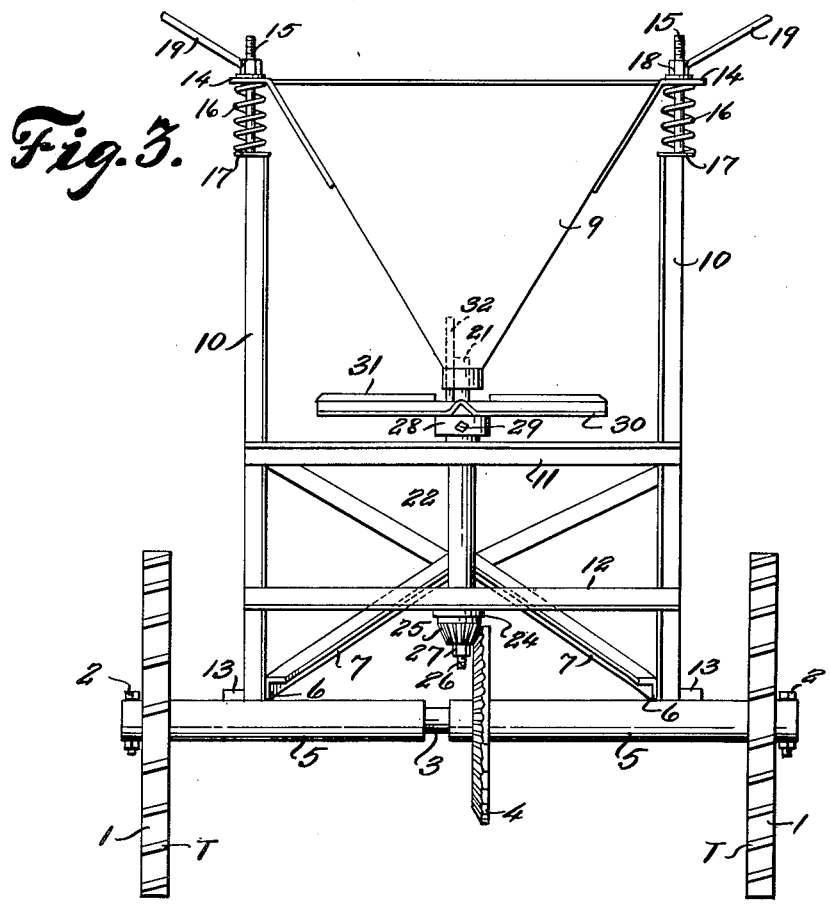
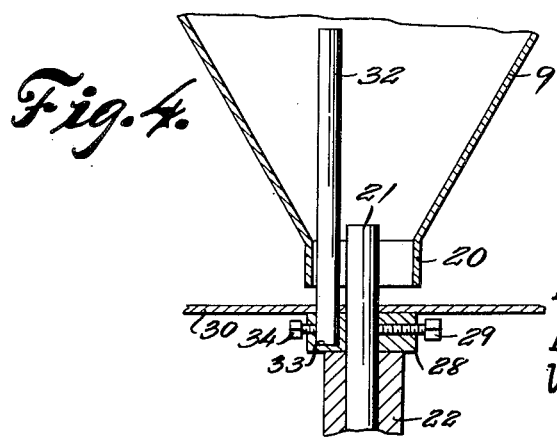
Marion E. Dow,
Raymond E. Dow, INVENTORS
Wainrite Dow.
BY *Victor J. Evans & Co.*
ATTORNEYS Patented Dec. 16, 1952

2,621,935

UNITED STATES PATENT OFFICE 2,621,935

FERTILIZER AND SEED DISTRIBUTOR

Marion E. Dow, Raymond E. Dow, and Wainrite Dow, Conway, Ark.

Application November 28, 1947, Serial No. 788,736

3 Claims. (Cl. 275—8)

Our present invention relates to the general class of scattering unloaders or agricultural implements of the wheeled, traversing type, and more specifically to an improved fertilizer and seed distributor embodying a horizontally disposed rotary scatterer that is vehicle-operated for distributing fertilizer, seed, and other granular material, as the implement is propelled by horse power, or by the use of an automotive vehicle of suitable type.

Means are utilized for adjusting the feed of the material to the rotary scatterer, and means are also provided for selective use in agitating the material as it is fed to the scatterer. In combination with the rotary scatterer we employ an adjustable hopper performing the functions of a feed valve, and power transmission means are interposed between a pair of traction wheels and the rotary scatterer for conveying motion and power from the former to the latter.

The vehicle-actuated implement of our invention is composed of a minimum number of parts that may with facility be manufactured at low cost of production, and the parts may be assembled with convenience to insure a durable implement that is simple in operation, may be controlled with ease, and is efficient in the performance of its functions without waste of material.

The invention consists in certain novel features of construction and combinations and arrangements of parts as will hereinafter be described and more particularly set forth in the appended claims. In the accompanying drawings we have illustrated a complete example of a physical embodiment of our invention wherein the parts are combined and arranged in accord with one mode we have devised for the practical application of the principles of our invention. It will however be understood that changes and alterations are contemplated and may be made in these exemplifying drawings and mechanical structures, within the scope of our claims, without departing from the principles of the invention.

Figure 3 is a rear end elevation of the implement; and

Figure 4 is a vertical detail sectional view showing the relation of the valve-feeding hopper and the rotary scatterer or table co-acting therewith.

Figure 1:
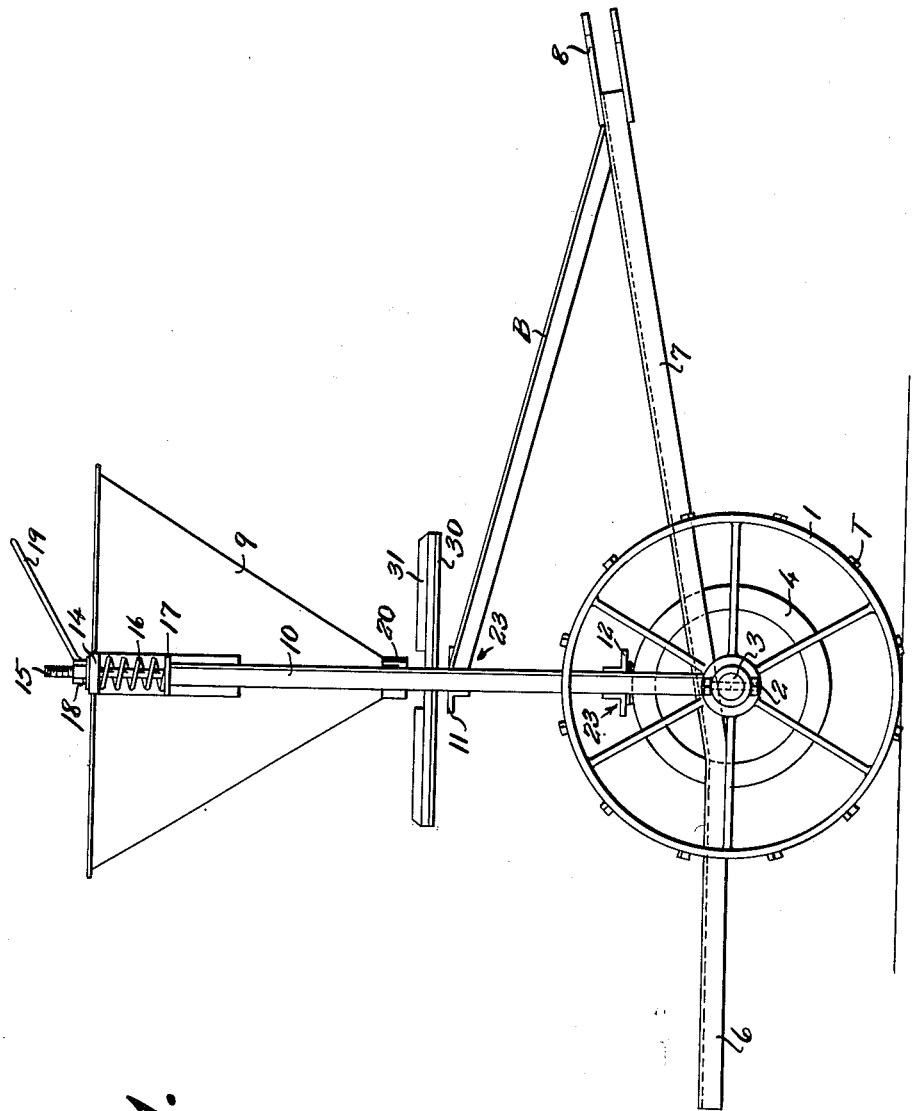
Figure 1 is a view in side elevation of an implement in which our invention is embodied.
Figure 2:
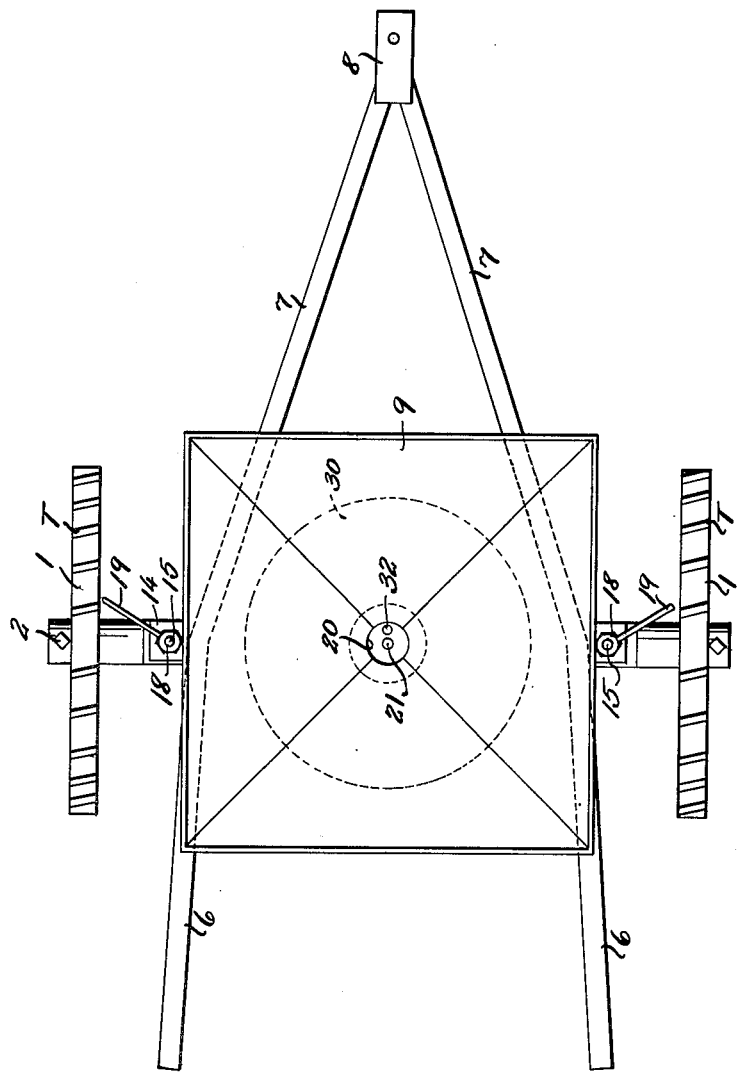
Figure 2 is a top plan view of the implement.

In this preferred form of the invention we utilize a wheeled implement that may be horse-drawn, or towed by a suitable automotive vehicle as it traverses a field to be cultivated, and for operating the implement we preferably employ two traction wheels 1, 1, having usual tread plates T, and the wheels are fixed as by bolts 2 to the opposite ends of a rotary axle 3.

The axle 3, which revolves with the wheels as the implement advances across the field, near its longitudinal center is provided with a vertically arranged bevel driving gear 4 that is rigidly fixed in suitable manner to revolve with the shaft, and a main frame of the implement is supported by the axle through the use of a pair of spaced bearing sleeves 5, 5 in which the axle is journaled.

The main frame of the implement includes a pair of rearwardly extending laterally spaced angle iron bars 6, 6 that converge at 7, 7 toward the front of the implement, and a drawbar hitch 8 is mounted in the converging ends of the frame.

A resiliently suspended or floating hopper 9, which forms a vertically movable and adjustable feed valve for the material, is mounted at the top of an upright hopper frame made up of a pair of posts 10, 10, an upper cross bar 11 and a lower cross bar 12, rigidly joined as by welding, or in other suitable manner, and this hopper frame is united at 13, 13 with the main frame and bearing sleeves, and braced by angle irons B, B, from the front of the main frame to the cross bars 11.

The downwardly tapering hopper for feeding the material is provided with an upper pair of outspreading suspending arms or hangers 14, 14 each having a bolt hole loosely fitted upon an upright stud bolt 15, each of the bolts being fixed as by welding on the upper end of a post. For resiliently mounting the floating hopper a spring 16 is coiled about each bolt and interposed between an arm 14 and a base plate 17 rigidly mounted on the top of a post, and an adjusting nut 18 having a lever handle 19 is threaded on each stud bolt.

As indicated the pair of springs tend to elevate the hopper, and the clamp nuts 18 may be turned on the stud bolts to depress and thus vertically adjust the hopper to desired position in the performance of its function as a valve for controlling the feed of material from the hopper to the scatterer.

The lower end of the tapered hopper terminates in a restricted cylindrical discharge neck 20 forming a discharge mouth or port that encloses the upper end of an upright rotary driven shaft 21, which is journaled in a bearing sleeve 22 rigidly mounted at 23, 23, in the center of the hopper supporting frame in combination with the cross bars 11 and 12. At its lower end the driven shaft is equipped with a bearing collar or thrust washer 24, and a bevel pinion 25 is secured on the end of the shaft, as at 26, by means of a lock nut 27.

The horizontally disposed bevel pinion is driven by means of the vertically disposed gear 4 to revolve the shaft 21, and the shaft, at its upper end, is provided with a head 28 secured thereon by means of a set bolt or screw 29.

The adjustable head 28, rigid with its shaft, forms a rotary base for a horizontally disposed scatterer or table 30, preferably of sheet metal that is rigid with the head or base and disposed horizontally below the valve-forming feed collar or mouth 20 of the hopper, and the circular table is preferably fashioned with radial blades or scattering vanes 31 that may conveniently be struck from, or pressed from the metal of the table.

As will be apparent from this description taken in connection with the drawings, the material flows through the discharge spout 20 onto the table, and the revolving table, by centrifugal force, dispenses the material in a horizontal plane, with the scattering vanes uniformly distributing the material in a wide circle for deposit on the ground.

For selective use in stirring or agitating the material as it is fed to the scatterer, an adjustable and removable agitating device or mechanism is employed for cooperation with the discharge spout of the hopper. This agitator comprises an upright bar or rod 32 that is eccentrically mounted in a socket 33 of the table head, and fixed in adjusted position by means of a set bolt or screw 34 threaded in the head. The stirrer rod or agitating bar projects upwardly into the hopper an ample distance for the performance of its functions in agitating the material as it feeds to the discharge port, and it thereby prevents clogging of the discharge port, to insure free flow of the material to the scatterer.

Having thus fully described our invention, what we claim as new and desire to secure by Letters Patent is:

1. In a fertilizer and seed distributor having a pair of ground engaging wheels, an axle for said wheels having supporting sleeves mounted thereon and hopper supporting posts connected to said sleeves and extending vertically therefrom, the improvement comprising a bolt fixed to and extending vertically and upwardly from the upper end of each post, a coil spring sleeved on each bolt, a hopper having laterally extending arms on opposite sides thereof mounted on the bolts in engagement with the springs, tensioning means on the bolts for tensioning the springs to vary the vibration of the hopper caused by the wheels passing over the ground, a rotary scattering disc below said hopper to distribute the seeds placed in said hopper as they are discharged therefrom and means coacting with said wheels for causing the rotation of said rotary scattering disc.

2. In a fertilizer or seed distributor having an axle, a pair of traction wheels on the axle, a pair of bearing sleeves journaled on the axle, and a frame supported on the sleeves, the improvement comprising a pair of vertically disposed parallel posts each fixed at its lower end to its respective bearing sleeve, a vertically upwardly extending bolt fixed to the upper end of each post, a coil spring sleeved on each bolt, a vertically adjustable hopper having a lower feed spout, a pair of laterally extending apertured arms on opposite sides of the hopper adapted to be mounted on the bolts in engagement with the springs and means on each bolt for retaining the hopper in depressed position, a rotary scatterer mounted in horizontal position beneath the feed spout, an upright shaft for rotating the scatterer, bearings for said shaft, an adjustable rotary base mounted on said shaft below said rotary scatterer, and fixed thereto, an upright bar mounted on said base, said bar extending vertically and upwardly through the hopper and feed spout eccentrically thereof for preventing clogging of the feed spout to insure free flow of material to the rotary scatterer, a driving gear on the axle, and a driven gear on the upright shaft.

3. In a fertilizer and seed distributor having an axle and a pair of traction wheels on the axle, the improvement comprising bearing sleeves mounted on the axle, hopper supporting posts connected to said sleeves and extending vertically therefrom, a bolt fixed to and extending vertically and upwardly from the upper end of each post, a coil spring sleeved on each bolt, a hopper having laterally extending arms on opposite sides thereof mounted on the bolts in engagement with the springs, tensioning means on the bolts for tensioning the springs to vary the vibration of the hopper caused by the wheels passing over the ground, a lower feed spout on the hopper, a rotary scatterer mounted in horizontal position beneath the feed spout, an upright shaft for rotating the scatterer, bearings for said shaft, a rotary support for the rotary scatterer, an agitator rod mounted on said support and extending vertically and upwardly through the hopper and feed spout eccentrically thereof for preventing clogging of the feed spout to insure free flow of material to the rotary scatterer, a drive gear on the axle and a driven gear on the upright shaft in engagement with said driving gear.

MARION E. DOW.
RAYMOND E. DOW.
WAINRITE DOW.

REFERENCES CITED

The following references are of record in the file of this patent:

UNITED STATES PATENTS

| Number | Name | Date |
| --- | --- | --- |
| 320,054 | Downie et al. | June 16, 1885 |
| 770,174 | Howard | Sept. 13, 1904 |
| 1,090,356 | Walker | Mar. 17, 1914 |
| 1,096,950 | Rittenhouse | May 19, 1914 |
| 1,162,903 | Cameron | Dec. 7, 1915 |
| 1,800,298 | Koch | Apr. 14, 1931 |
| 2,287,080 | Arndt | June 23, 1942 |
| 2,322,171 | Spatz | June 15, 1943 |
| 2,334,376 | Bauer | Nov. 16, 1943 |
| 2,441,072 | Johnson | May 4, 1948 |